United States Patent
Matsubayashi et al.

(10) Patent No.: US 6,673,282 B2
(45) Date of Patent: Jan. 6, 2004

(54) METHOD FOR PROTECTING DIES IN AN INJECTION MOLDING MACHINE

(75) Inventors: Haruyuki Matsubayashi, Numazu (JP); Takamitsu Yamashita, Numazu (JP); Takashi Yamazaki, Mishima (JP); Motoyuki Miyauchi, Shizuoka-ken (JP); Yutaka Yamaguchi, Shizuoka-ken (JP); Masamitsu Suzuki, Numazu (JP); Makoto Nishizawa, Numazu (JP)

(73) Assignee: Toshiba Machine Co., Ltd., Tokyo (JP)

( * ) Notice: Subject to any disclaimer, the term of this patent is extended or adjusted under 35 U.S.C. 154(b) by 0 days.

(21) Appl. No.: 10/108,987

(22) Filed: Mar. 29, 2002

(65) Prior Publication Data

US 2002/0180079 A1 Dec. 5, 2002

(30) Foreign Application Priority Data

Apr. 2, 2001 (JP) ........................................ 2001-103616

(51) Int. Cl.⁷ ............................................... B29C 45/76
(52) U.S. Cl. ..................... 264/40.1; 264/40.5; 425/150; 425/593
(58) Field of Search ............................... 264/40.1, 40.5; 425/593, 150

(56) References Cited

U.S. PATENT DOCUMENTS

| | | | | |
|---|---|---|---|---|
| 4,710,119 A | * | 12/1987 | Otake | 425/136 |
| 4,726,920 A | * | 2/1988 | Yokota | 264/40.5 |
| 5,057,255 A | * | 10/1991 | Sato et al. | 264/40.5 |
| 5,059,365 A | | 10/1991 | Hertzer et al. | |
| 5,102,587 A | * | 4/1992 | Kumamura et al. | 264/40.1 |
| 5,161,594 A | | 11/1992 | Bolton et al. | |
| 5,770,808 A | | 6/1998 | Yokoyama | |
| 5,800,750 A | * | 9/1998 | Laing et al. | 264/40.5 |
| 6,402,998 B1 | | 6/2002 | Onishi | |
| 2002/0028262 A1 | | 3/2002 | Yamaguchi et al. | |

FOREIGN PATENT DOCUMENTS

| | | |
|---|---|---|
| CH | 638 702 | 10/1983 |
| DE | 42 39 179 A1 | 12/1993 |
| DE | 196 32 475 C2 | 10/1997 |
| JP | 59-191558 | 10/1984 |
| JP | 61-71164 | 4/1986 |
| JP | 61-255755 | 11/1986 |
| JP | 64-5654 | 1/1989 |
| JP | 3-90267 | 4/1991 |
| JP | 3-155445 | 7/1991 |
| JP | 3-254351 | 11/1991 |
| JP | 10-15653 | 1/1998 |
| JP | 10-58113 | 3/1998 |

OTHER PUBLICATIONS

Webster's II New Riverside Collegiate Dictionary, published 1984, p. 1207.*

* cited by examiner

Primary Examiner—Michael Colaianni
Assistant Examiner—Monica Fontaine
(74) Attorney, Agent, or Firm—Pillsbury Winthrop LLP

(57) ABSTRACT

A stationary die is held on the front surface of a stationary platen and a movable die is held on the front surface of a movable platen. A plurality of monitoring sections are set in advance within a moving range of the movable platen and an upper limit of forward thrust of the movable platen is set for each of the monitoring sections. When the forward thrust of the movable platen reaches the upper limit set in one of the monitoring sections during a die closing operation, it is determined that abnormality occurs to stop the movable platen from moving forward. If a die closing mechanism is of a toggle link type, the forward thrust of the movable platen is calculated based on the thrust of a crosshead which drives a toggle link mechanism, the moving speed of the crosshead, and the moving speed of the movable platen.

6 Claims, 9 Drawing Sheets

The angular pin enters the inclined hole of the slide core, moving the slide core.

The slide core is displaced.

The angular pin does not enter the inclined hole of the slide core, and the stationary die and the movable die do not contact.

The force tightening the dies is applide to the angular pin, inevitably breaking the angular pin.

METHOD FOR PROTECTING DIES IN AN INJECTION MOLDING MACHINE

CROSS-REFERENCE TO RELATED APPLICATIONS

This application is based upon and claims the benefit of priority from the prior Japanese Patent Application No. 2001-103616, filed Apr. 2, 2001, the entire contents of which are incorporated herein by reference.

BACKGROUND OF THE INVENTION

1. Field of the Invention

The present invention relates to a method for protecting dies during a die closing operation in an injection molding machine and, more specifically, to a method for monitoring a forward thrust of a movable die.

2. Description of the Related Art

In a prior art injection molding machine, when a die closing operation is performed, a forward thrust of a movable platen is monitored. When the forward thrust exceeds a preset upper limit, the machine determines that some abnormality has occurred and protects dies. More specifically, a specific monitoring section is set within a moving range of the movable platen immediately before a movable die is brought into close contact with a stationary die. When the forward thrust of the movable platen exceeds the above upper limit within the monitoring section, the machine determines that some abnormality has occurred and stops the movable platen from moving forward.

In the prior art injection molding machine, the monitoring section of the forward thrust of the movable platen is limited to a range immediately before the movable die and the stationary die are brought into close contact with each other. In the case of dies having a plurality of plates, if the movable platen falls outside the monitoring section, abnormalities (e.g., galling of a sliding section of a slide core, shortage of lubricating oil, galling of another sliding section) cannot be detected during the die closing operation.

FIGS. 8 and 9 each show an example of a die closing operation in dies having a plurality of plates.

When a die closing operation is normally performed, as shown in FIG. 8, an angular pin 6, which is provided on the front of a movable plate 1A that is part of a stationary die 1, is inserted into an inclined hole of a slide core 7 provided on the front of a movable die 3, and the slide core 7 is pressed and moved by the angular pin 6, with the result that the front of a movable die 2 is brought into close contact with that of the movable plate 1A. After that, while the movable die 2 remains in contact with the movable plate 1A, it continues to advance and stops when the back of the movable plate 1A is brought into contact with a runner stripper plate 1B that is the remaining part of the stationary die 1.

In contrast, when a die closing operation is performed while the slide core 7 is not located in a normal position, as shown in FIG. 9, the angular pin 6 is not inserted into the inclined hole of the slide core 7 but the movable die 2 advances while the top end of the angular pin 6 is in contact with the vicinity of the edge of the slide core 7. In this case, even though the back of the movable plate 1A contacts the runner stripper plate 1B, the die closing operation is continued since the movable die 2 has not yet reached a die closing completion position. Consequently, the forward thrust of a movable platen 4 is all exerted on the angular pin 6 to cause damage to the angular pin 6.

If, in the above case, a monitoring section of the forward thrust of the movable platen 4 is set longer than the length of the angular pin 6, a die protecting operation can be carried out by detecting that the forward thrust exceeds the upper limit. For the die protecting operation, it is preferable that the upper limit be set as low as possible. The above case, however, requires the minimum thrust for inserting the angular pin 6 into the inclined hole of the slide core 7, and the set upper limit becomes larger than a normal one. Since the forward thrust corresponding to the larger upper limit is applied to the angular pin 6, the possibility that the angular pin 6 will be damaged is not eliminated. If the upper limit is set larger than the normal one, the same problem will occur even though products are left in the die due to a drop failure and a take-out failure. In other words, the forward thrust of the movable platen is exerted on the products remaining between the dies in the monitoring section, thereby causing damage to the dies.

Moreover, in the monitoring section of the forward thrust, the die closing speed usually needs to be set lower in order to protect the dies effectively. If, therefore, the monitoring section is lengthened, cycle time for injection molding is lengthened to decrease productivity.

BRIEF SUMMARY OF THE INVENTION

The present invention has been developed in consideration of the above problems of the prior art method for protecting dies in an injection molding machine. An object of the present invention is to provide a method for protecting dies, which is capable of reliably detecting abnormalities during a die closing operation and hardly decreases productivity.

According to an aspect of the present invention, there is provided a method for protecting dies in an injection molding machine, the injection molding machine comprising:
  a stationary platen which holds a stationary die;
  a movable platen arranged opposite to the stationary platen, which holds a movable die; and
  a driving control system which drives the movable platen and performs a die closing operation between the movable die and the stationary die,
  wherein the method comprises:
    setting a plurality of monitoring sections within a moving range of the movable platen;
    setting an upper limit of forward thrust of the movable platen for each of the monitoring sections; and
    performing a die protecting operation when the forward thrust of the movable platen reaches the upper limit set in one of the monitoring sections during the die closing operation.

According to the die protecting method described above, a plurality of monitoring sections are set within a moving range of a movable platen in accordance with the positions of respective guide members provided on the contact surface of a die and the contents of abnormalities that are expected during the die closing operation, and an upper limit of the forward thrust of the movable platen is set for each of the monitoring sections. The abnormalities can thus be detected with reliability during the die closing operation and the possibility that the dies will be damaged can be reduced.

Furthermore, cycle time for molding can be minimized by performing a monitoring operation only in the section where the occurrence of abnormalities is expected during the die closing operation.

Preferably, the driving control system comprises a servomotor whose torque and speed is controlled, and a ball screw driven by the servomotor. The ball screw moves the movable platen.

Preferably, the driving control system comprises a hydraulic cylinder and a hydraulic circuit which controls pressure and a flow rate of oil supplied to the hydraulic cylinder. The hydraulic cylinder moves the movable platen.

In an injection molding machine having a toggle link mechanism for die closing, usually, the forward thrust of the movable platen cannot directly be detected. It is thus necessary to calculate the forward thrust of the movable platen from the thrust of a driving source of the toggle link mechanism.

If the driving control system comprises a link housing, a toggle link mechanism which couples the link housing and the movable platen to each other, and a crosshead which expands or contracts the toggle link mechanism and advances or retreats the movable platen, the forward thrust of the movable platen can be calculated from the thrust of the crosshead by the following method. A table representing a correlation between a position of the crosshead and a position of the movable platen is stored in advance in a storage unit. A speed ratio between the crosshead and the movable platen is calculated from an amount of movement of the crosshead per unit time and that of movement of the movable platen per unit time using the table during a die closing operation. The forward thrust of the movable platen can thus be calculated from the thrust of the crosshead using the speed ratio.

DETAILED DESCRIPTION OF THE INVENTION (Embodiment 1)

Figure 1:
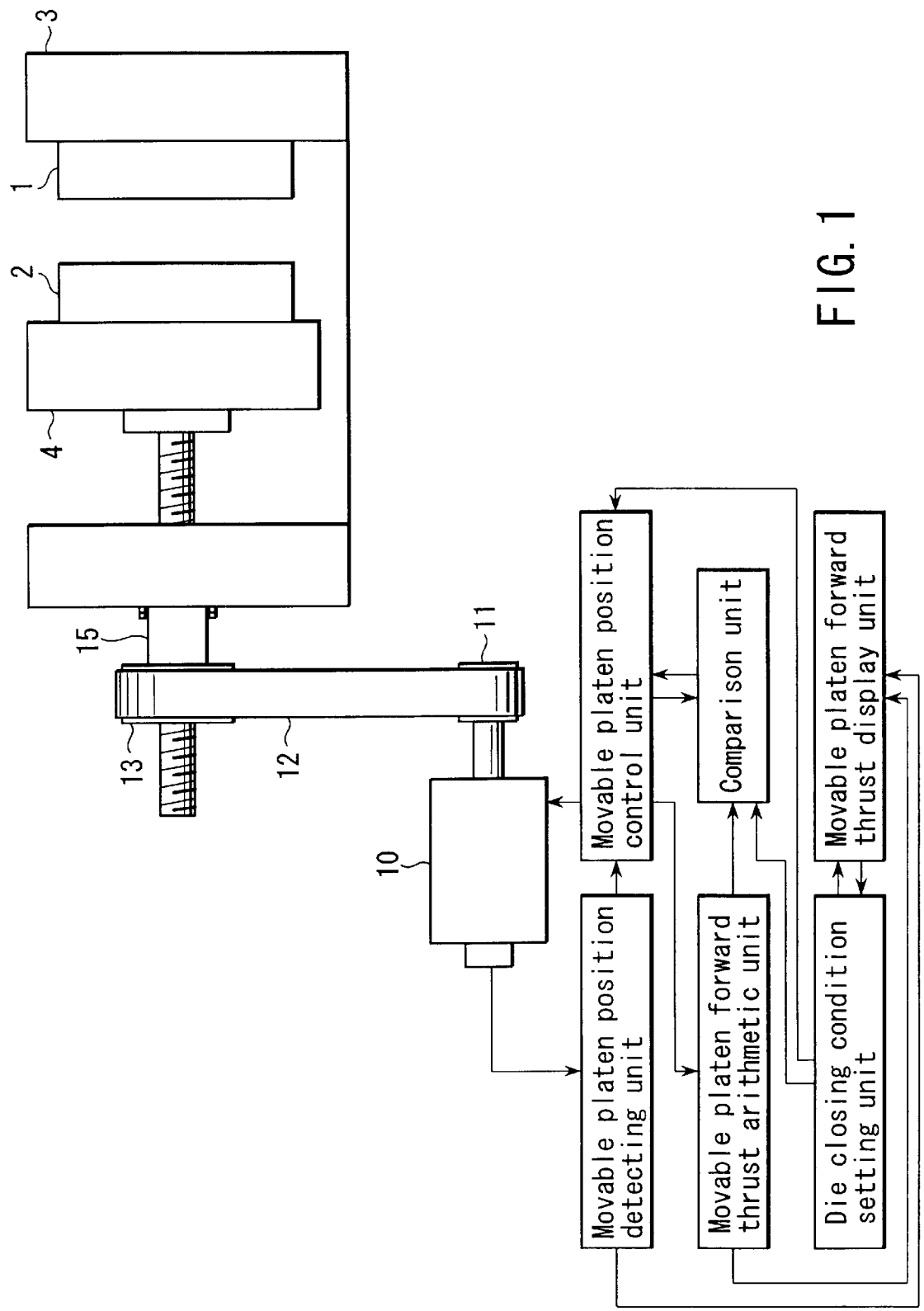
FIG. 1 is a block diagram of a system configuration in which a die protecting method according to the present invention is applied to an injection molding machine having an electric direct-acting die closing mechanism.

FIG. 1 shows a system configuration in which a die protecting method according to the present invention is applied to an injection molding machine having an electric direct-acting die closing mechanism.

In the electric direct-acting die closing mechanism, a servomotor 10 serves as a driving source to drive a movable platen 4 using a ball screw 15. A pulley 11 is attached to the end of a shaft of the servomotor 10, while another pulley 13 is attached to the outside of a nut portion of the ball screw 15. These pulleys 11 and 13 are coupled to each other by a timing belt 12. The movable platen 4 is connected to the top end of a threaded rod of the ball screw 15. A stationary platen 3 is arranged opposite to the movable platen 4. A movable die 2 is held on the front of the movable platen 4, and a stationary die 1 is held on the front of the stationary platen 3.

A die closing condition setting unit sets monitoring sections and an upper limit of forward thrust of the movable platen for each of the monitoring sections as conditions for protecting the dies.

When a die closing operation starts, a movable platen position control unit supplies a command current to the servomotor and sends a value of the command current to a comparison unit. A movable platen position detecting unit detects a position of the movable platen from the number of revolutions of the servomotor and supplies its data to both the movable platen position control unit and a movable platen forward thrust display unit.

A movable platen forward thrust arithmetic unit calculates a forward thrust of the movable platen by the following equation based on the command current of the servomotor supplied from the movable platen position control unit, and sends it to both the comparison unit and the movable platen forward thrust display unit.

$$P = \frac{TQC * BPN * I}{BL * MPN}$$

where P is the forward thrust of the movable platen, TQC is the torque constant of the servomotor, BL is the lead of the ball screw, MPN is the number of teeth of the pulley on the servomotor side, BPN is the number of teeth of the pulley on the ball screw side, and I is the command current of the servomotor.

Using the following equation, the movable platen position control unit calculates a driving current (current limit value) of the servomotor that corresponds to the upper limit of the forward thrust of the movable platen that is set by the die closing condition setting unit for each monitoring section.

$$IL = \frac{PS * BL * MPN}{TQC * BPN}$$

where IL is the current limit value of the servomotor and PS is the upper limit of the forward thrust of the movable platen set for each monitoring section.

The comparison unit compares the forward thrust of the movable platen calculated by the movable platen forward thrust arithmetic unit and the upper limit of the forward thrust set by the die closing condition setting unit for each monitoring section. As a result of the comparison, when the forward thrust of the movable platen is not smaller than the above upper limit, the comparison unit instructs the movable platen position control unit to perform a die protecting operation.

The movable platen forward thrust display unit displays on a display a relationship between the position and the forward thrust of the movable platen calculated as described above and also displays the set monitoring section and the upper limit of the forward thrust in each monitoring section.

In the monitoring section, the movable platen position control unit controls the driving current of the servomotor, considering the current limit value (IL) of the servomotor to be the upper limit.

(Embodiment 2)

Figure 2:
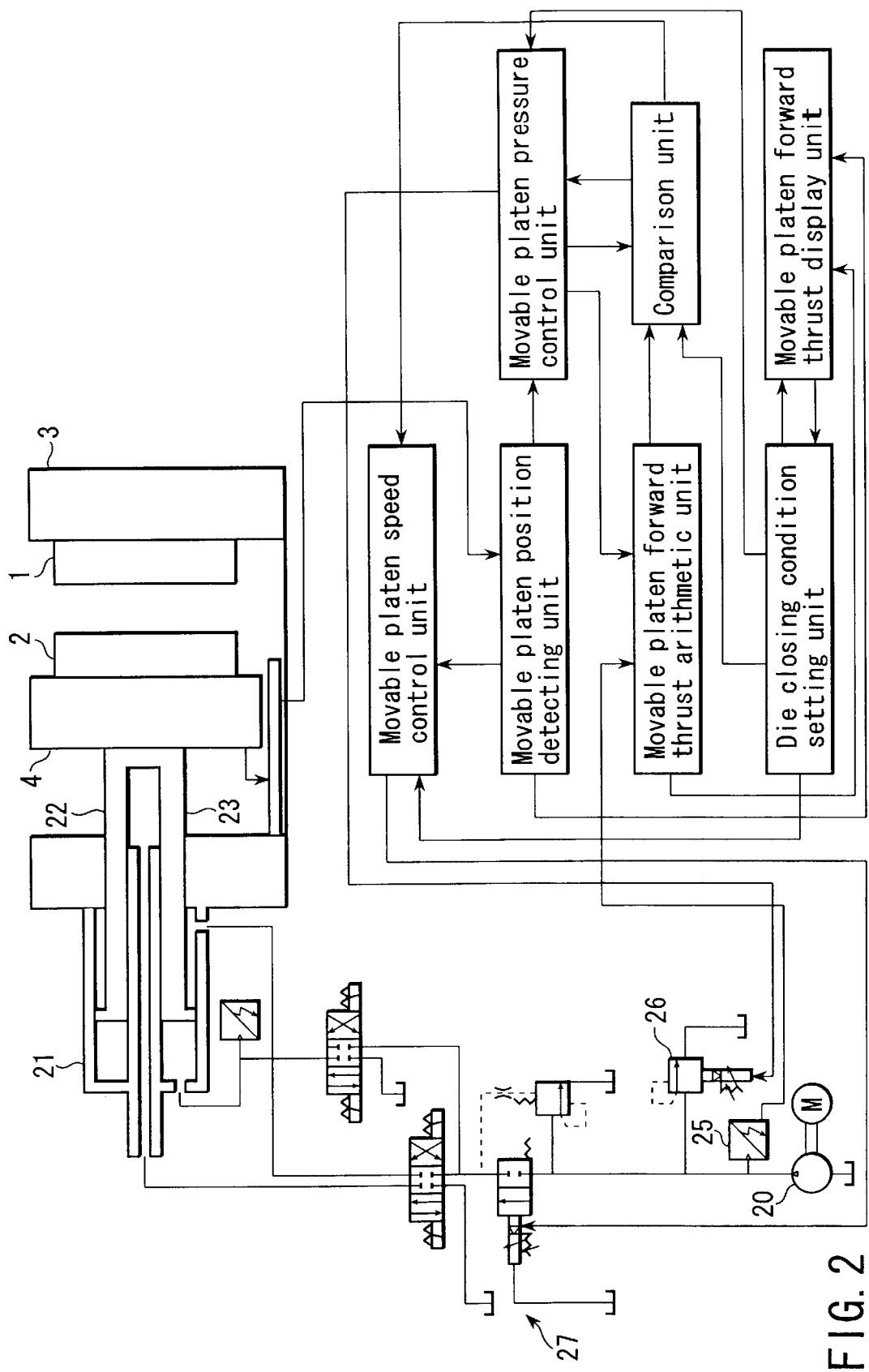
FIG. 2 is a block diagram of a system configuration in which a die protecting method according to the present invention is applied to an injection molding machine having a hydraulic direct-acting die closing mechanism.

FIG. 2 shows a system configuration in which a die protecting method according to the present invention is applied to an injection molding machine having a hydraulic direct-acting die closing mechanism.

In the hydraulic direct-acting die closing mechanism, a hydraulic pump 20 serves as a driving source to drive a movable platen 4 using both a die closing cylinder 21 and a boost cylinder 23. The movable platen 4 is connected to the top end of a rod portion 22 of the die closing cylinder 21.

The mechanism shown in FIG. 2 differs from the electric direct-acting die closing mechanism shown in FIG. 1 in that the control of the advance speed of the movable platen 4 by the boost cylinder 23, is performed by adjusting the flow rate of oil that is discharged from the hydraulic pump 20, in a method of detecting a position of the movable platen 4, and in a method of calculating a forward thrust of the movable platen 4.

When a die closing operation starts, a movable platen speed control unit controls a flow rate control valve 27 to make the advance speed of the movable platen equal to a die closing speed set by a die closing condition setting unit. A movable platen pressure control unit controls a pressure control valve 26 to control the oil pressure of the hydraulic pump 20 on its discharge side.

A movable platen position detecting unit detects a position of the movable platen and sends its data to the movable platen speed control unit, movable platen pressure control unit, and movable platen forward thrust display unit.

Using the following equation, a movable platen forward thrust arithmetic unit calculates a forward thrust of the movable platen from the oil pressure detected by a pressure sensor 25 that is connected to the discharge side of the hydraulic pump 20.

$$P = A * HP$$

where P is the forward thrust of the movable platen, A is the sectional area of the boost cylinder, and HP is the pressure detected by the pressure sensor.

Using the following equation, the movable platen pressure control unit calculates oil pressure (pressure limit value) of the boost cylinder 23 that corresponds to the upper limit of the forward thrust of the movable platen that is set by the die closing condition setting unit for each monitoring section.

$$HPL = PS/A$$

where HPL is the pressure limit value and PS is the upper limit of the forward thrust of the movable platen set for each monitoring section.

A comparison unit compares the forward thrust of the movable platen calculated by the movable platen forward thrust arithmetic unit and the upper limit of the forward thrust set by the die closing condition setting unit for each monitoring section. When the forward thrust of the movable platen becomes not smaller than the upper limit, the comparison unit instructs both the movable platen speed control unit and the movable platen pressure control unit to perform a die protecting operation.

In the monitoring section, the movable platen pressure control unit controls the pressure of oil supplied to the boost cylinder, considering the pressure limit value (HPL) to be the upper limit of the pressure.

(Embodiment 3)

Figure 3:
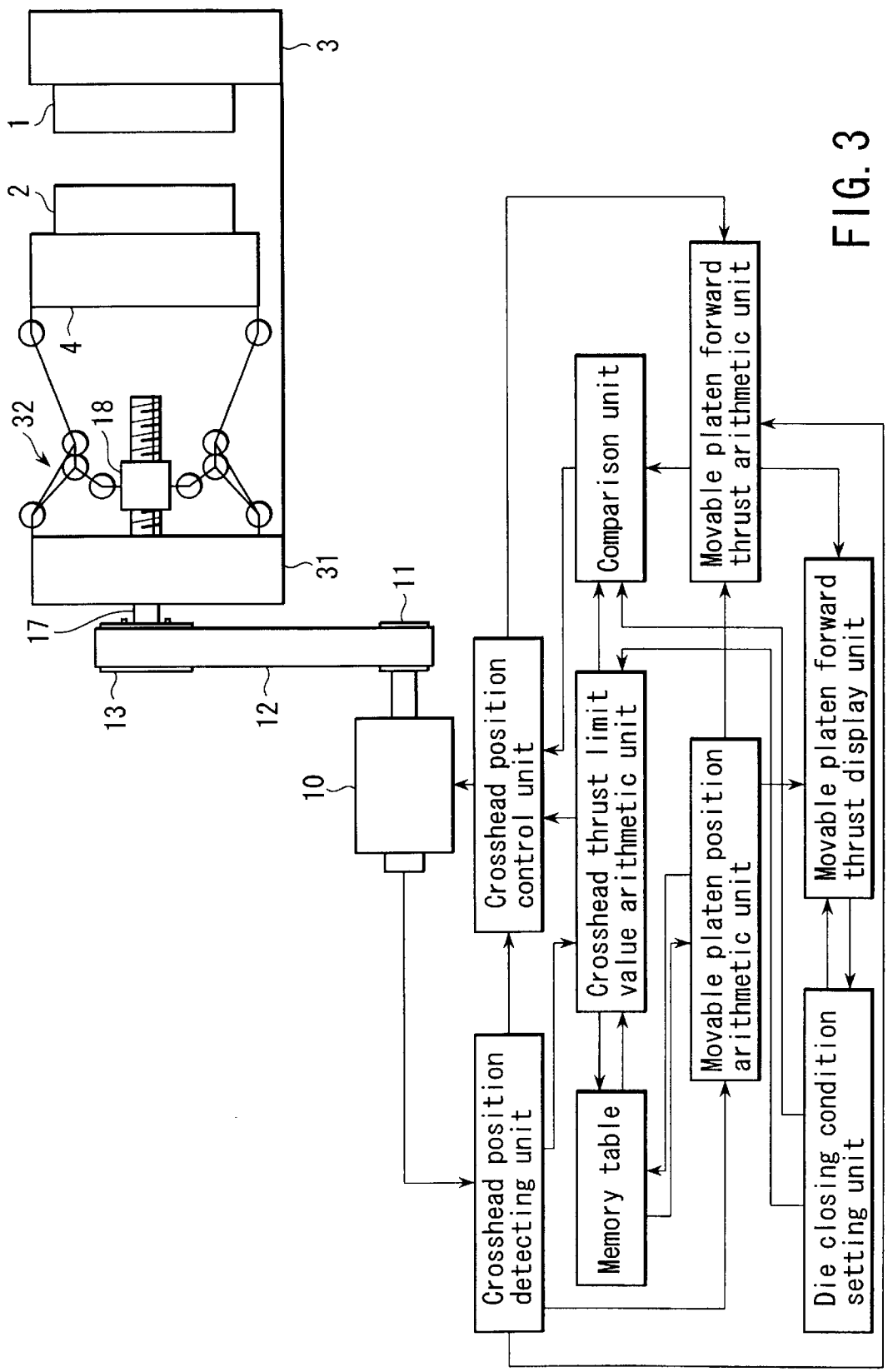
FIG. 3 is a block diagram of a system configuration in which a die protecting method according to the present invention is applied to an injection molding machine having an electric toggle link mechanism for die closing.

FIG. 3 shows a system configuration in which a die protecting method according to the present invention is applied to an injection molding machine having an electric toggle link mechanism for die closing.

In the electric toggle link die closing mechanism, a movable platen 4 is provided in front of a link housing 31 with a toggle link mechanism 32 interposed therebetween. The toggle link mechanism 32 is expanded or contracted by a crosshead 18 driven by a feed screw 17, thereby controlling the back-and-forth motion of the movable platen 4. The feed screw 17 is driven by a servomotor 10. A pulley 11 is attached to the end of a shaft of the servomotor 10 and another pulley 13 is attached to the rear end portion of the feed screw 17. These pulleys 11 and 13 are coupled to each other by a timing belt 12.

In the electric toggle link mechanism for die closing, a relationship between the amount of movement of the crosshead 18 and that of movement of the movable platen 4 is not linear. Therefore, a correlation between the position of the crosshead 18 and that of the movable platen 4 is stored in advance in a memory table in the form of a mathematical table or a mathematical expression. Using the memory table, a position of the movable platen is calculated from the position of the crosshead.

A die closing condition setting unit sets an upper limit of forward thrust of the movable platen for each of monitoring sections as conditions for protecting dies.

When a die closing operation starts, a crosshead position control unit supplies a command current to the servomotor and sends a value of the command current to a comparison unit. The crosshead position detecting unit detects a position of the crosshead from the number of revolutions of the servomotor and supplies its data to the crosshead position control unit, a crosshead thrust limit value arithmetic unit, a movable platen position arithmetic unit, and a movable platen forward thrust arithmetic unit.

The movable platen position arithmetic unit calculates a position of the movable platen from the position of the crosshead using the above-described memory table and then supplies a value of the calculated position to both the movable platen forward thrust arithmetic unit and the movable platen forward thrust display unit.

The movable platen forward thrust arithmetic unit calculates a speed ratio between the crosshead and the movable platen from the amount of movement of the crosshead per unit time and the amount of movement of the movable platen per unit time. Then, the movable platen forward thrust arithmetic unit calculates a forward thrust of the movable platen from the calculated speed ratio and the thrust of the crosshead using the following equation, and sends the calculated forward thrust to both the comparison unit and the movable platen forward thrust display unit.

$$P = \frac{TQC * BPN * I * (XHP_i - XHP_{i-1})}{BL * MPN * (MPP_i - MPP_{i-1})}$$

where P is the forward thrust of the movable platen, TQC is the torque constant of the servomotor, BL is the lead of the feed screw, MPN is the number of teeth of the pulley on the servomotor side, BPN is the number of teeth of the pulley on the feed screw side, I is the command current of the servomotor, $XHP_i$ is the current position of the crosshead, $XHP_{i-1}$ is the position of the crosshead located one sampling period before, $MPP_i$ is the current position of the movable platen, and $MPP_{i-1}$ is the position of the movable platen located one sampling period before.

The crosshead thrust limit value arithmetic unit calculates a position of the movable platen, using the above memory table, from the position of the crosshead sent from the crosshead position detecting unit. The crosshead thrust limit value arithmetic unit also calculates a driving current (crosshead thrust limit value) of the servomotor, which corresponds to the upper limit of the forward thrust of the movable platen set by the die closing condition setting unit for each monitoring section, using the following equation and sends the calculated driving current to both the comparison unit and the crosshead position control unit.

$$IL = \frac{PS * BL * MPN * (MPP_i - MPP_{i-1})}{TQC * BPN * (XHP_i - XHP_{i-1})}$$

where IL is the crosshead thrust limit value and PS is the upper limit of the forward thrust of the movable platen set for each monitoring section.

The comparison unit compares the forward thrust of the movable platen calculated by the movable platen forward thrust arithmetic unit and the upper limit of the forward thrust set by the die closing condition setting unit for each monitoring section. When the forward thrust of the movable platen becomes not smaller than the upper limit, the comparison unit instructs the crosshead position control unit to perform a die protecting operation.

In the monitoring section, the crosshead position control unit controls the driving current of the servomotor, considering the crosshead thrust limit value (IL) to be the upper limit.

(Embodiment 4)

Figure 4:
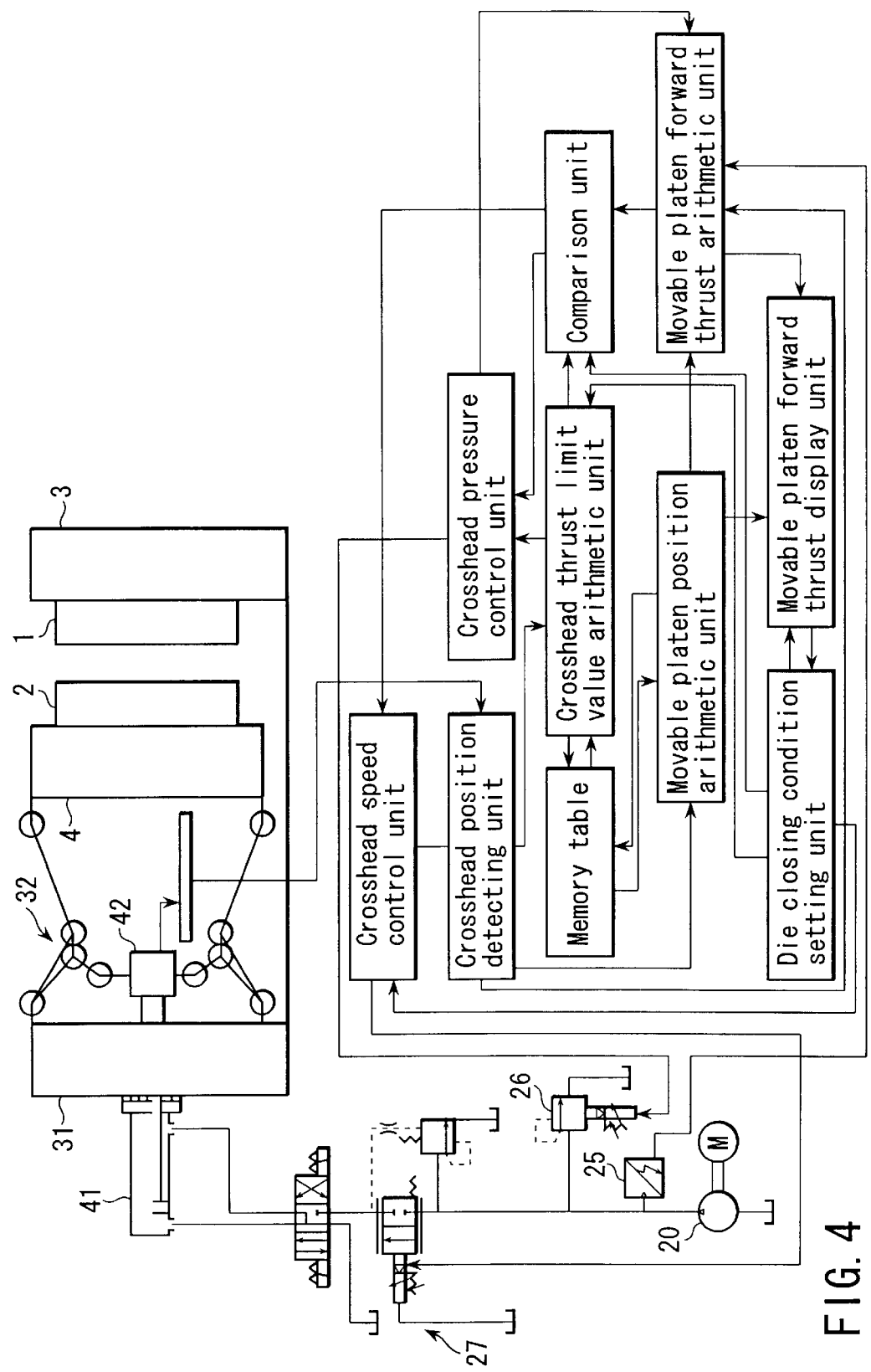
FIG. 4 is a block diagram of a system configuration in which a die protecting method according to the present invention is applied to an injection molding machine having a hydraulic toggle link mechanism for die closing.

FIG. 4 shows a system configuration in which a die protecting method according to the present invention is applied to an injection molding machine having a hydraulic toggle link mechanism for die closing.

In the hydraulic toggle link mechanism for die closing, a movable platen 4 is provided in front of a link housing 31 with a toggle link mechanism 32 interposed therebetween. The toggle link mechanism 32 is expanded or contracted by a crosshead 42 driven by a hydraulic cylinder 41, thereby controlling the back-and-forth motion of the movable platen 4.

The mechanism shown in FIG. 4 differs from the electric toggle link die closing mechanism shown in FIG. 3 in that the advance speed of the movable platen 4 is controlled by adjusting the flow rate of oil that is discharged from a hydraulic pump 20, in a method of detecting a position of the crosshead 42, and in a method of calculating a forward thrust of the movable platen 4.

A die closing condition setting unit sets monitoring sections and an upper limit of forward thrust of the movable platen for each of the monitoring sections as conditions for protecting dies.

When a die closing operation starts, a crosshead speed control unit controls a flow rate control valve 27 to make the advance speed of the crosshead equal to the die closing speed set by the die closing condition setting unit. A crosshead pressure control unit controls a pressure control valve 26 to control the oil pressure of the hydraulic pump 20 on its discharge side.

A crosshead position detecting unit detects a position of the crosshead and sends its data to the crosshead speed control unit, the crosshead thrust limit value arithmetic unit, the movable platen position arithmetic unit, and the movable platen forward thrust arithmetic unit.

The movable platen position arithmetic unit calculates a position of the movable platen from the position of the crosshead using the above-described memory table and then supplies a value of the calculated position to both the movable platen forward thrust arithmetic unit and the movable platen forward thrust display unit.

The movable platen forward thrust arithmetic unit calculates a speed ratio between the crosshead and the movable platen from the amount of movement of the crosshead per unit time and that of movement of the movable platen per unit time. Then, the movable platen forward thrust arithmetic unit calculates a forward thrust of the movable platen, using the following equation, from both the calculated speed ratio and the oil pressure (thrust of the crosshead) detected by a pressure sensor 25 connected to the discharge side of the hydraulic pump 20, and sends the calculated forward thrust to both the comparison unit and the movable platen forward thrust display unit.

$$P = \frac{A * HP * (XHP_i - XHP_{i-1})}{(MPP_i - MPP_{i-1})}$$

where P is the forward thrust of the movable platen, A is the area of the head of the hydraulic cylinder, HP is the oil pressure detected by the pressure sensor, $XHP_i$ is the current position of the crosshead, $XHP_{i-1}$ is the position of the crosshead located one sampling period before, $MPP_i$ is the current position of the movable platen, and $MPP_{i-1}$ is the position of the movable platen located one sampling period before.

Using the above memory table, the crosshead thrust limit value arithmetic unit calculates a position of the movable platen from the position of the crosshead sent from the crosshead position detecting unit. Using the following equation, the crosshead thrust limit value arithmetic unit calculates oil pressure (crosshead thrust limit value) of the hydraulic cylinder, which corresponds to the upper limit of the forward thrust of the movable platen set by the die closing condition setting unit for each monitoring section, and sends the calculated oil pressure to both the comparison unit and the crosshead position control unit.

$$HPL = \frac{PS * (MPP_i - MPP_{i-1})}{A * (XHP_i - XHP_{i-1})}$$

where HPL is the crosshead thrust limit value and PS is the upper limit of the forward thrust of the movable platen set for each monitoring section.

The comparison unit compares the forward thrust of the movable platen calculated by the movable platen forward thrust arithmetic unit and the upper limit of the forward thrust set by the die closing condition setting unit for each monitoring section. When the forward thrust of the movable platen is not smaller than the upper limit, the comparison unit instructs both the crosshead speed control unit and the crosshead pressure control unit to perform a die protecting operation.

In the monitoring section, the crosshead pressure control unit controls the pressure of oil supplied to the hydraulic cylinder, considering the crosshead thrust limit value (HPL) to be the upper limit of the oil pressure.

(Embodiment 5)

Figure 5:
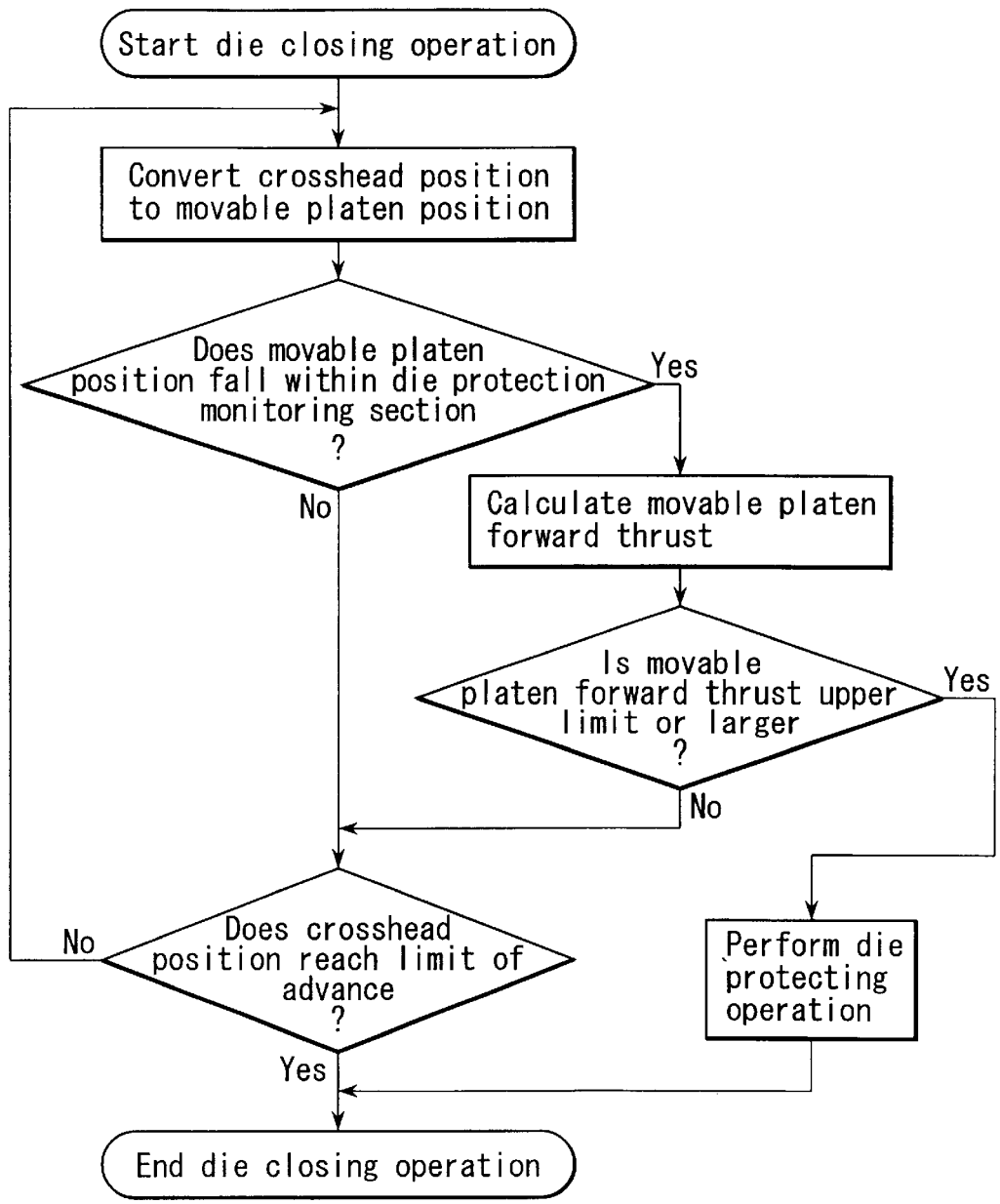
FIG. 5 is a flowchart showing a die protecting method in an injection molding machine having a toggle link mechanism for die closing.

FIG. 5 shows a flowchart of a die protecting method in a (electric or hydraulic) toggle link mechanism for die closing, that is a method for monitoring a forward thrust of a movable platen.

When a die closing operation starts, a crosshead position is converted to a movable platen position every data sampling period to determine whether the movable platen position falls within one of monitoring sections. If the position falls within none of the monitoring sections, it is determined whether the crosshead reaches the limit of advance. If the crosshead does not reach it, the flow returns to the initial step. If the crosshead reaches it, the die closing operation ends.

When the movable platen position falls within one of monitoring sections, the forward thrust of the movable platen is calculated from the thrust of the crosshead. Then, it is determined whether the forward thrust of the movable platen is not smaller than the upper limit that is set for each monitoring section. If the forward thrust is smaller than the preset upper limit, it is determined whether the crosshead has reached the limit of advance. If not, the flow returns to the initial step. When the crosshead has reached the limit of advance, the die closing operation ends. If the forward thrust of the movable platen is the above upper limit or larger, a die protecting operation is performed and the die closing operation ends.

(Embodiment 6)

Figure 6:
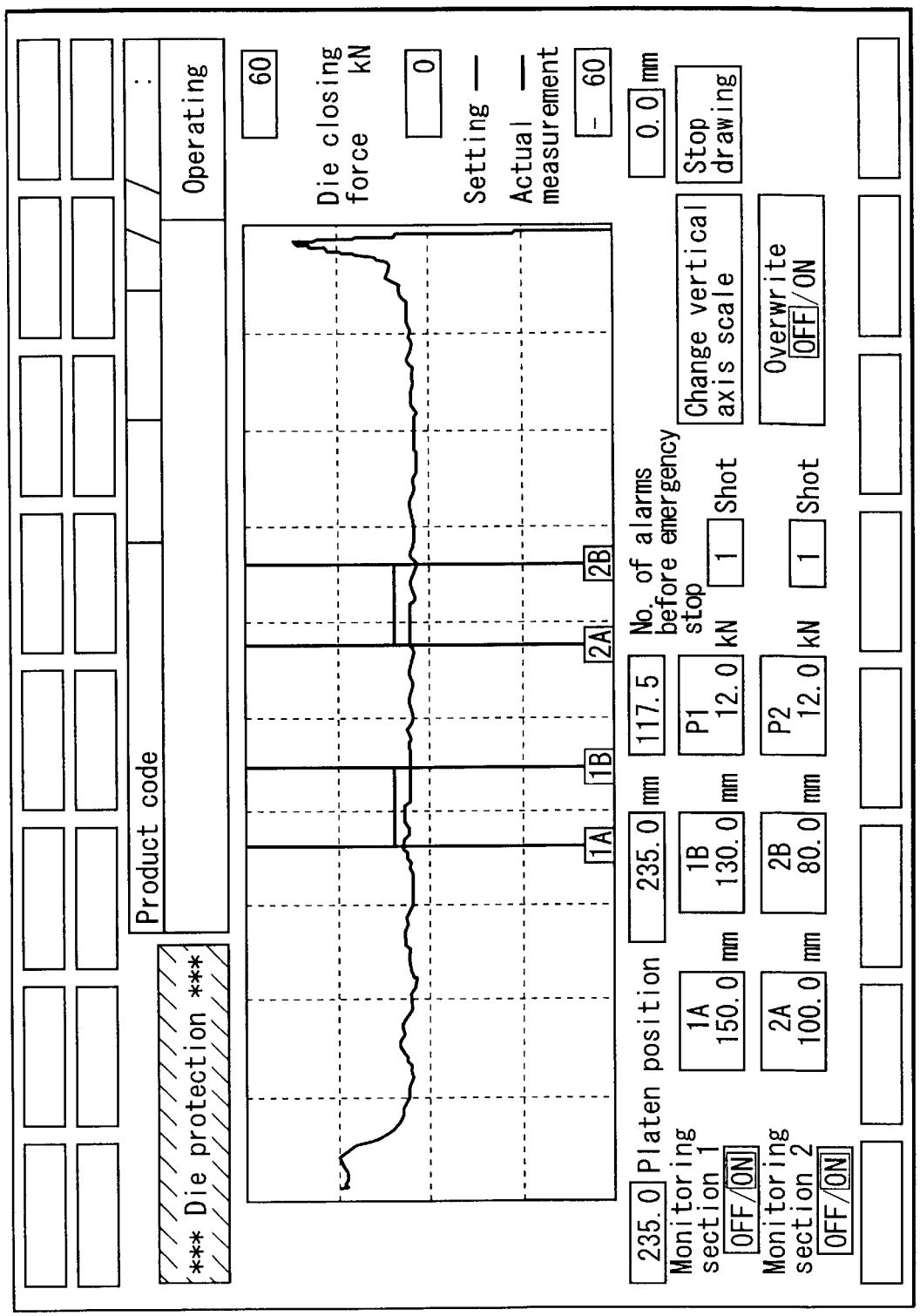
FIG. 6 is an example of a display screen of a graphic display panel when a die closing operation is normally performed.
Figure 7:
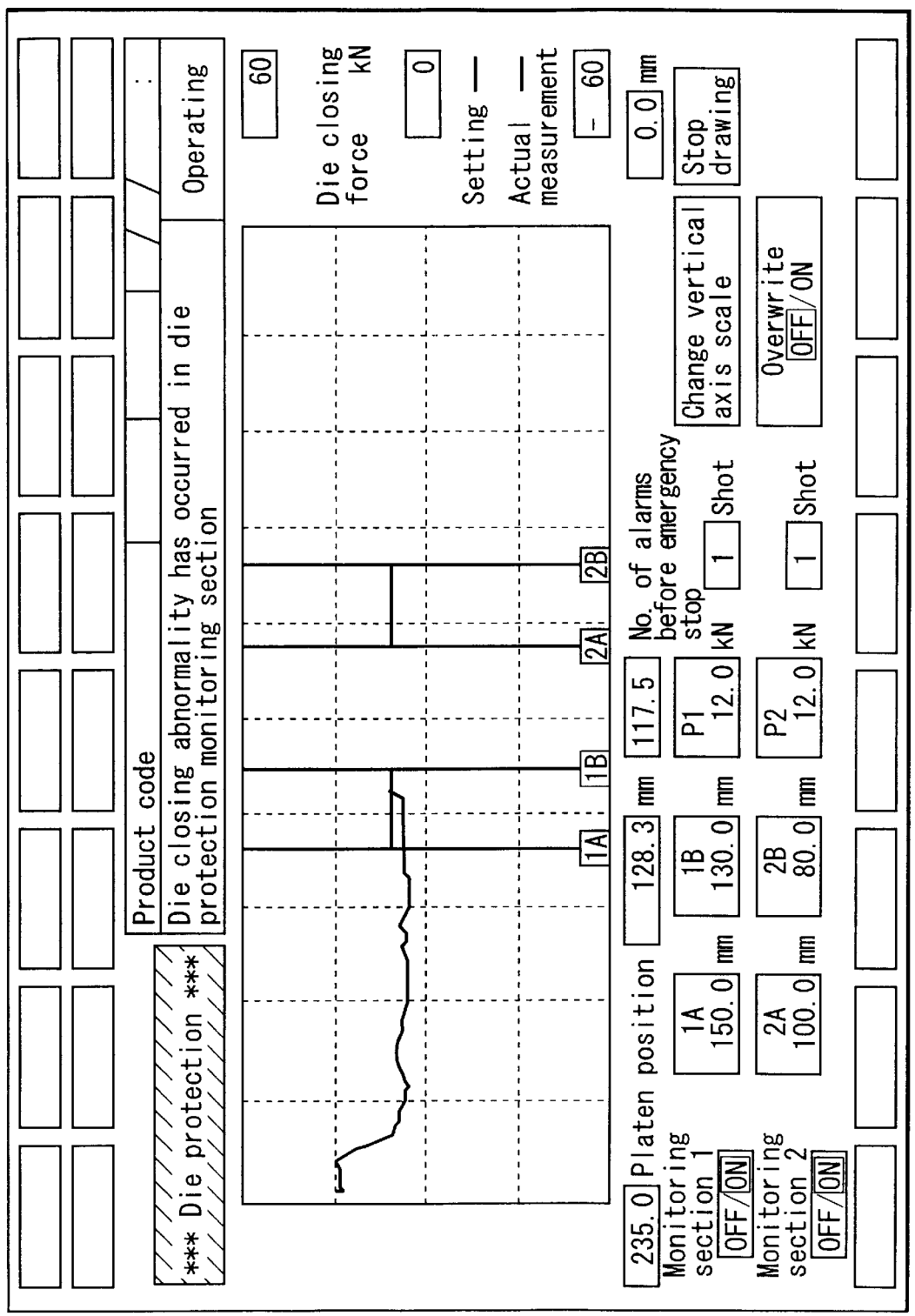
FIG. 7 is an example of a display screen of a graphic display panel when abnormality occurs during a die closing operation.
Figure 8:
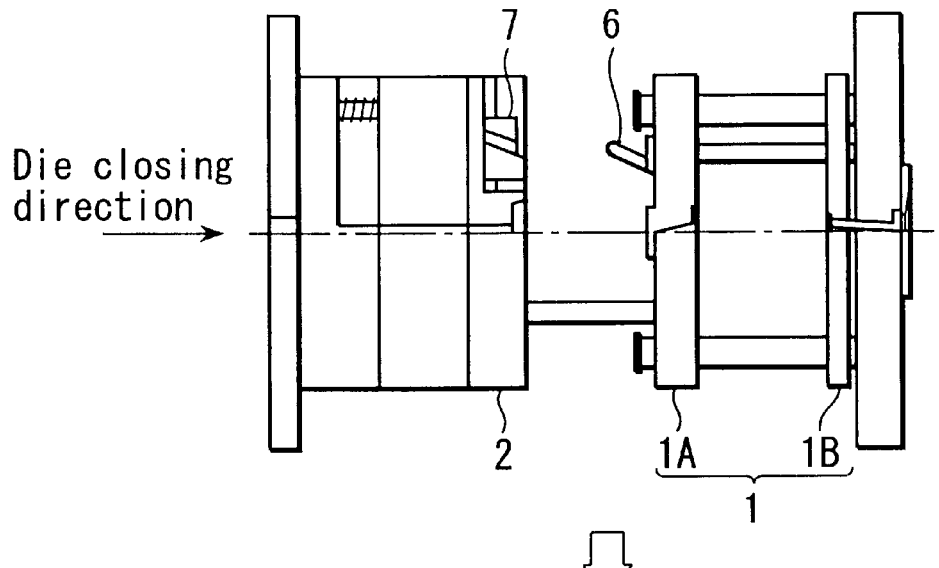
FIG. 8 is an illustration of a case where a die closing operation is normally performed in dies having a plurality of plates.
Figure 8:
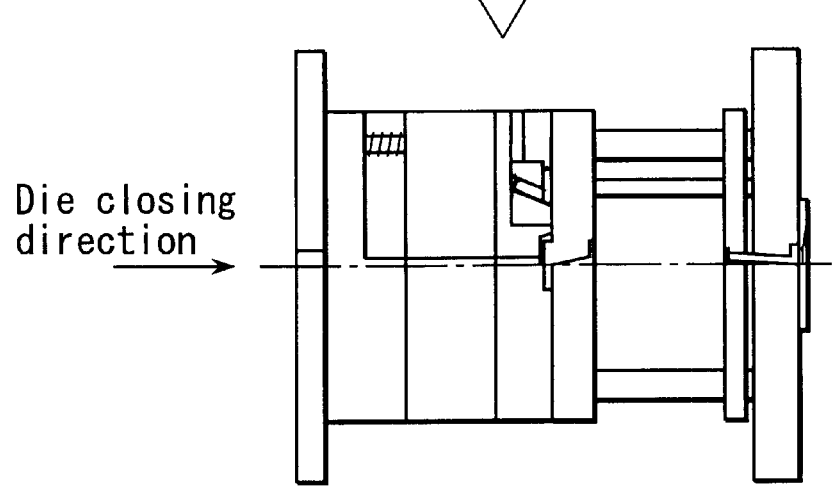
Figure 8:
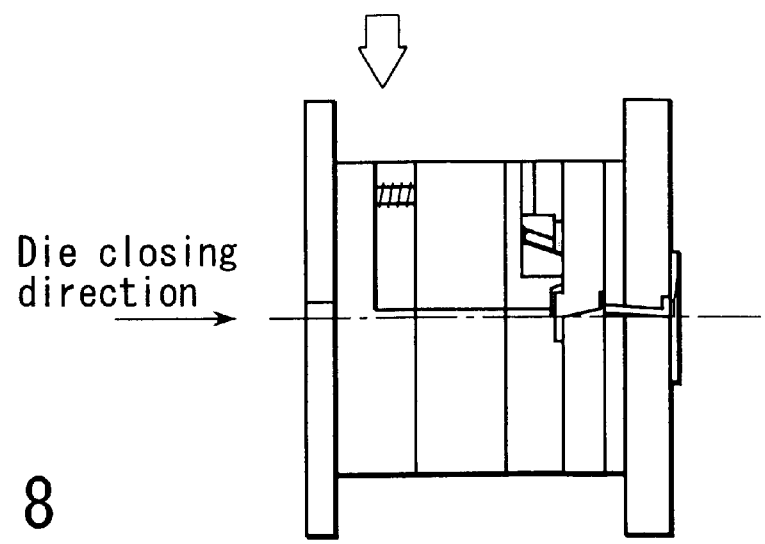

FIGS. 6 and 7 each illustrate an example of a display screen on a graphic display panel of a driving system to which the die protecting method according to the present invention is applied. FIG. 6 is an example of a display screen indicating that a die closing operation is normally performed, and FIG. 7 is an example of a display screen indicating that abnormality occurs during a die closing operation.

Referring to FIGS. 6 and 7, the graphic display panel graphically displays the actual measurement data of the forward thrust of the movable platen (vertical axis: die closing force) with respect to the position of the movable platen (horizontal axis: movable platen position). The left side of the graph corresponds to the limit of retreat of the movable platen and the right side thereof corresponds to the limit of advance of the movable platen. Moreover, the graphic display panel displays a plurality of monitoring sections (monitoring section 1:1A to 1B and monitoring section 2:2A to 2B) set in a moving range of the movable platen and the upper limit (P1 and P2) of the forward thrust of the movable platen set for each of the monitoring sections.

When the forward thrust of the movable platen is smaller than the upper limit set for each of the monitoring sections, the die closing operation is performed to the end as shown in FIG. 6.

In contrast, when the forward thrust of the movable platen becomes not smaller than the upper limit set for each of the monitoring sections during the die closing operation, the die protecting operation is performed as shown in FIG. 7 and then the die closing operation ends.

Figure 9:
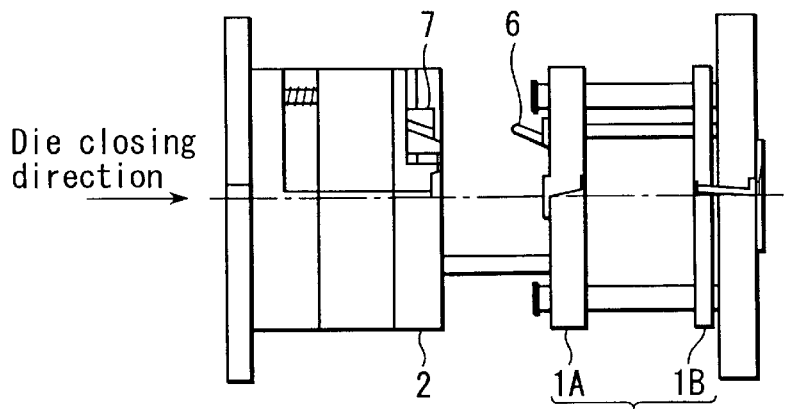
FIG. 9 is an illustration of a case where abnormality occurs during a die closing operation in dies having a plurality of plates.
Figure 9:
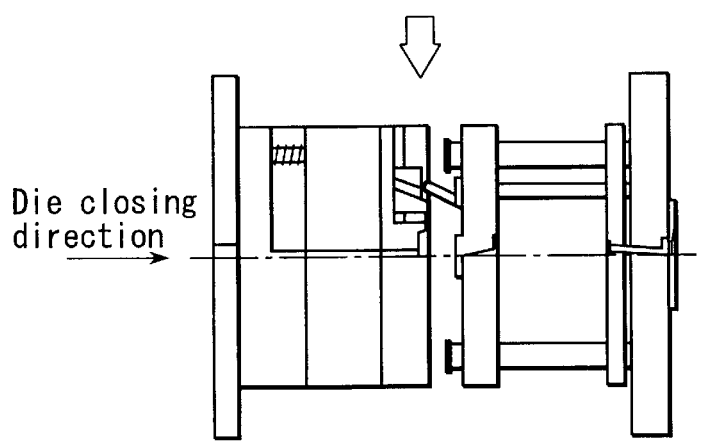
Figure 9:
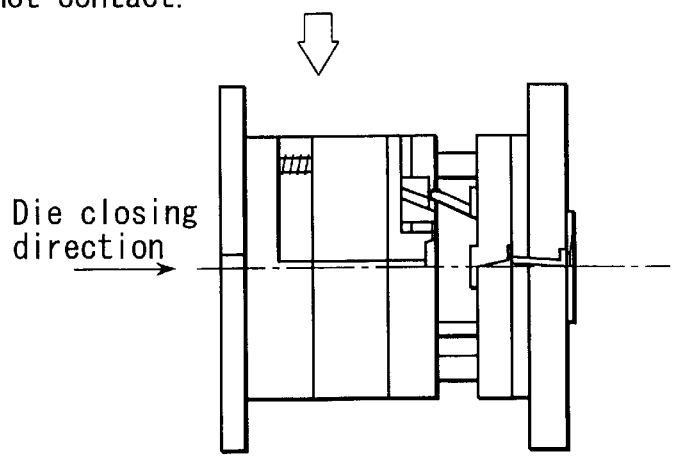

FIG. 7 shows an example in which a die protecting operation is performed because an angular pin of a die is not inserted into an inclined hole of a slide core (see FIG. 9). More specifically, when the angular pin hits the slide core, the forward thrust of the movable platen is changed and the changed forward thrust becomes not smaller than the upper limit (P1) set for the monitoring section 1 (1A to 1B); therefore, the die protecting operation is performed.

According to the die protecting method of the present invention, a plurality of monitoring sections can be set within a moving range of a movable platen in accordance with the positions of respective guide members provided on the contact surface of a die and the contents of abnormalities that are expected during the die closing operation, and an upper limit of the forward thrust of the movable platen can be set for each of the monitoring sections. The abnormalities can thus be detected with reliability during the die closing operation and the possibility that the dies will be damaged can be reduced.

Furthermore, cycle time for injection molding can be minimized by performing a monitoring operation only in the section where the occurrence of abnormalities is expected during the die closing operation.

What is claimed is:

1. A method for protecting dies in an injection molding machine, the injection molding machine comprising:

a stationary platen which holds a stationary die;

a movable platen arranged opposite to the stationary platen, which holds a movable die; and a driving control system which drives the movable platen and performs a die closing operation between the movable die and the stationary die, wherein the method comprises:

setting a plurality of monitoring sections within a moving range of the movable platen;

setting a monitoring section-dependent upper limit of forward thrust of the movable platen for each of the monitoring sections; and performing a die protecting operation when the forward thrust of the movable platen reaches the upper limit set in one of the monitoring sections during the die closing operation.

2. A method for protecting dies in an injection molding machine according to claim 1, wherein the driving control system comprises:

a servomotor whose torque and speed is controlled; and a ball screw driven by the servomotor, wherein the ball screw moves the movable platen.

3. A method for protecting dies in an injection molding machine according to claim 1, wherein the driving control system comprises:

a hydraulic cylinder; and a hydraulic circuit which controls pressure and a flow rate of oil supplied to the hydraulic cylinder, wherein the hydraulic cylinder moves the movable platen.

4. A method for protecting dies in an injection molding machine according to claim 1, wherein the driving control system comprises:

a link housing;

a toggle link mechanism which couples the link housing and the movable platen to each other;

a crosshead which expands or contracts the toggle link mechanism and advances or retreats the movable platen; and an arithmetic unit which calculates forward thrust of the movable platen from thrust of the crosshead, wherein the arithmetic unit calculates a speed ratio between the crosshead and the movable platen from an amount of movement of the crosshead per unit time and that of movement of the movable platen per unit time using a table which is stored in advance in a storage unit and represents a correlation between a position of the crosshead and a position of the movable platen, and then calculates the forward thrust of the movable platen from the thrust of the crosshead using the speed ratio.

5. A method for protecting dies in an injection molding machine according to claim 4, wherein the crosshead is provided with thrust by a feed screw rotated by a servomotor whose torque and speed is controlled.

6. A method for protecting dies in an injection molding machine according to claim 4, wherein the crosshead is provided with thrust by a hydraulic cylinder which controls pressure and a flow rate of oil supplied thereto.

* * * * *